United States Patent [19]

Ten Eyck

[11] Patent Number: 4,612,087

[45] Date of Patent: Sep. 16, 1986

[54] METHOD OF PRODUCING SEAMLESS CERAMIC FIBER COMPOSITE ARTICLES

[75] Inventor: John D. Ten Eyck, Lewistown, N.Y.

[73] Assignee: Kennecott Corporation, Cleveland, Ohio

[21] Appl. No.: 529,077

[22] Filed: Sep. 2, 1983

Related U.S. Application Data

[63] Continuation-in-part of Ser. No. 348,482, Feb. 12, 1982, Pat. No. 4,435,468.

[51] Int. Cl.$^4$ ............................ B32B 5/22; E04B 1/00
[52] U.S. Cl. ................................... 162/129; 162/131
[58] Field of Search .............. 428/285, 212, 298, 299, 428/284, 285, 446, 288, 290; 52/270, 699, 506; 162/129, 131

[56] References Cited

U.S. PATENT DOCUMENTS

| | | | |
|---|---|---|---|
| 1,345,377 | 7/1920 | Linbarger | 92/39 |
| 1,477,288 | 12/1923 | Shaw | 92/39 |
| 1,532,084 | 3/1925 | Shaw | 92/39 |
| 1,924,573 | 8/1933 | Schur | 92/3 |
| 2,098,733 | 11/1937 | Sale | 92/39 |
| 2,348,829 | 5/1944 | MacArthur et al. | 18/47.5 |
| 2,765,247 | 10/1956 | Graham | 154/46 |
| 3,220,915 | 11/1965 | Shannon | 161/149 |
| 3,493,463 | 2/1970 | Baker | 161/149 |
| 3,598,696 | 8/1971 | Beck | 162/298 |
| 3,988,183 | 10/1976 | Senn | 156/62.8 |
| 3,996,325 | 12/1976 | Megraw | 264/113 |
| 4,032,394 | 6/1977 | Back | 162/164 R |
| 4,152,494 | 5/1979 | Wang | 521/91 |
| 4,203,255 | 5/1980 | Nasland et al. | 49/399 |
| 4,239,591 | 12/1980 | Blake | 162/109 |
| 4,250,220 | 2/1981 | Schlatter et al. | 428/212 |
| 4,435,468 | 3/1984 | Ten Eyck | 428/285 |

Primary Examiner—Marion C. McCamish
Attorney, Agent, or Firm—David M. Ronyak

[57] ABSTRACT

The invention relates to a ceramic fiber felt or mat having one portion comprising a high temperature resistant ceramic fiber and another portion of lower temperature resistant ceramic fiber. The two portions are joined seamlessly by an intermingling and intimate relationship of the two fiber types during formation of the mat. The invention further provides apparatus for formation of such ceramic fiber composites and further provides for forming such composite ceramic fiber members into modules.

6 Claims, 9 Drawing Figures

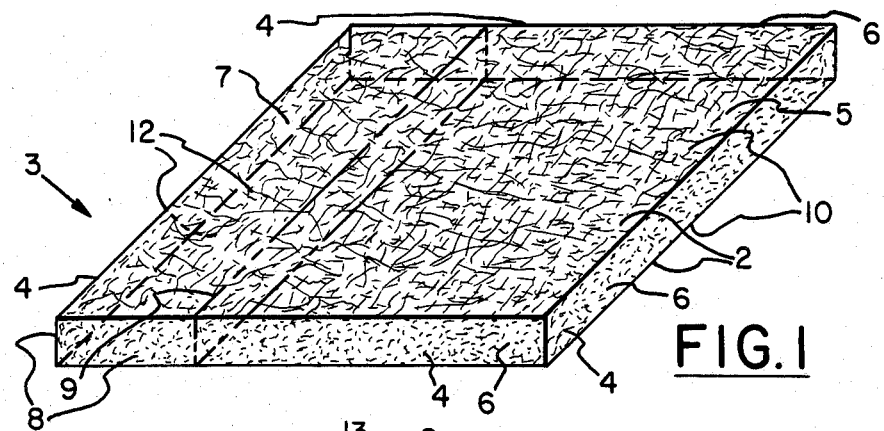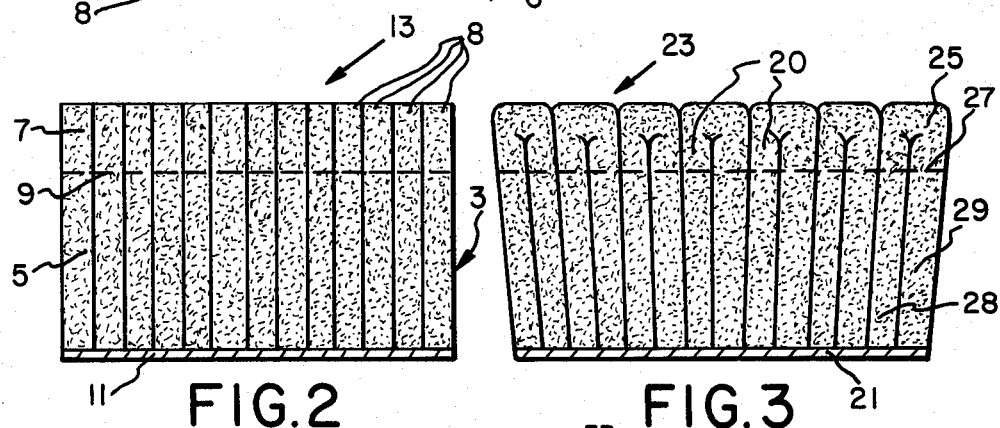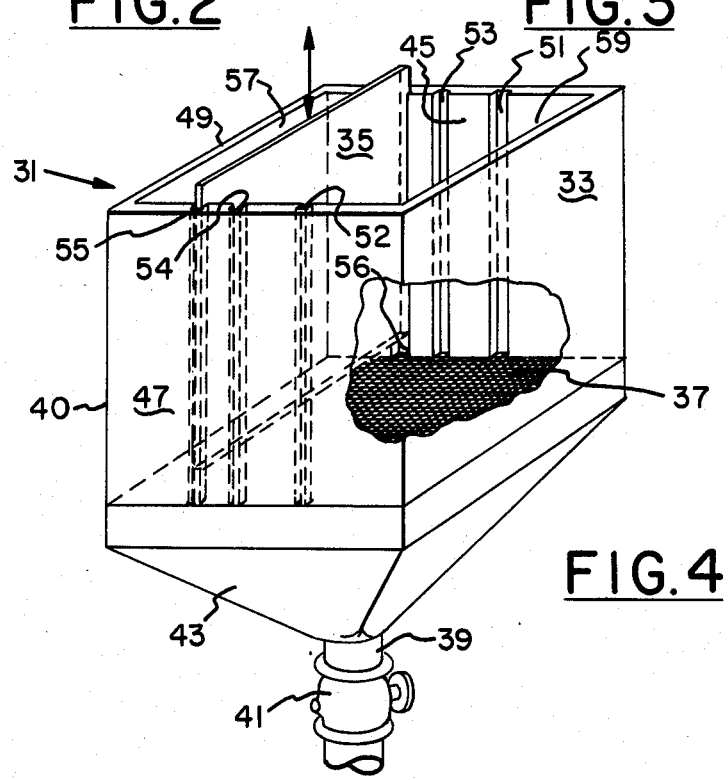

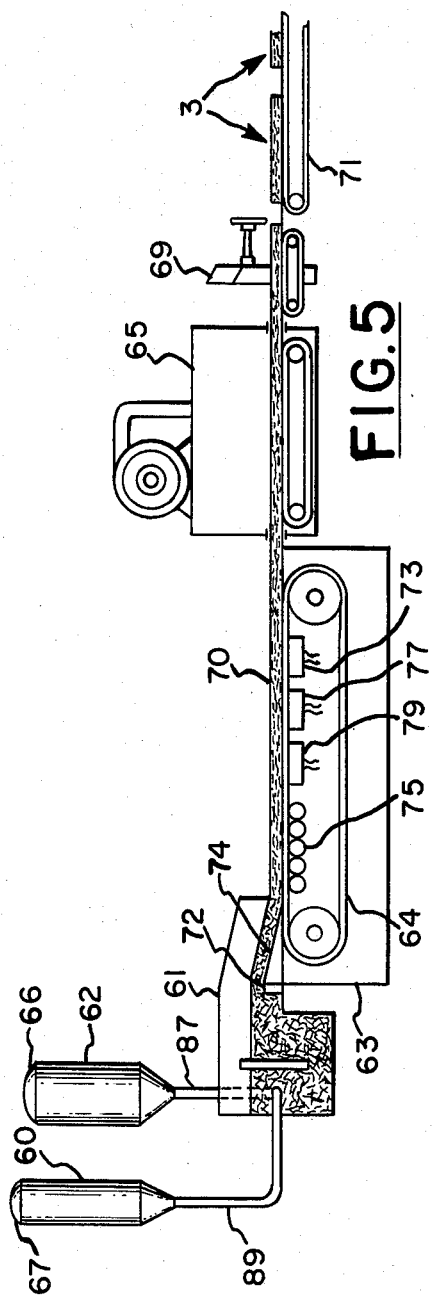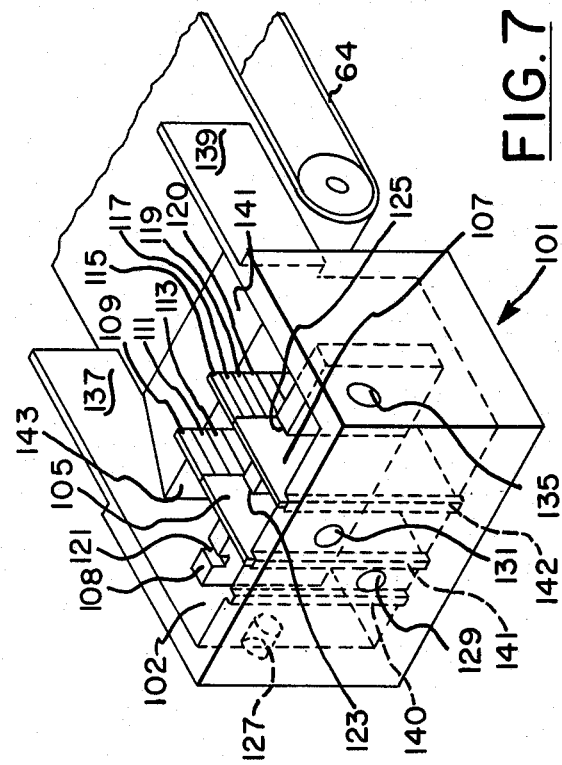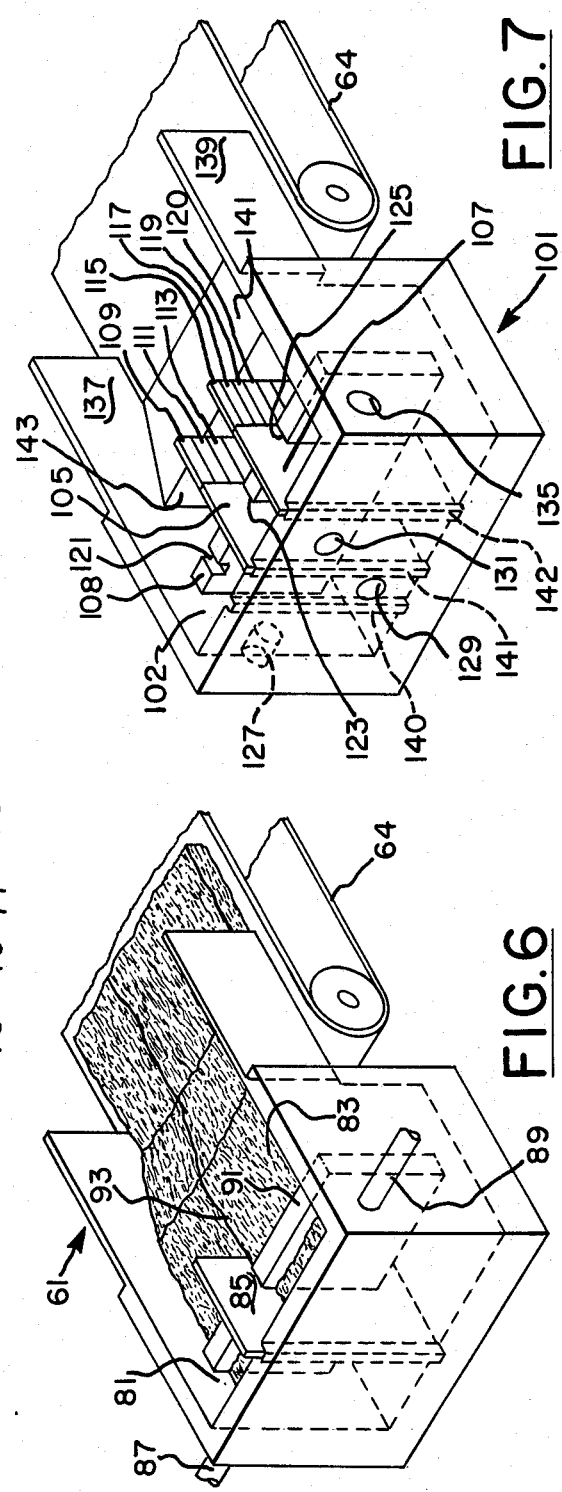

METHOD OF PRODUCING SEAMLESS CERAMIC FIBER COMPOSITE ARTICLES

This is a continuation-in-part of application Ser. No. 348,482, filed Feb. 12, 1982, now U.S. Pat. No. 4,435,468.

TECHNICAL FIELD

The present invention relates to a composite ceramic fiber article and the method and apparatus for its production. It more particularly relates to formation of a ceramic fiber module in which the hot face (that which will be presented to the hot interior of a furnace) presents a high temperature resistant fiber while away from the hot face the fiber is a lower temperature resistant fiber with the higher and lower temperature resistant fibers being joined in an area of intimate commingling of the fibers.

BACKGROUND ART

The utilization of ceramic fibers for insulation of high temperature furnaces has been practiced in several methods. In one method, sheets of ceramic fiber are attached to the wall much in the manner of layered wallpaper. It is known in such constructions to utilize lower temperature resistant ceramic fibers adjacent the cold face of the shell of the furnace with higher temperature resistant fibers forming the layers of the hot face. This system has disadvantages in that it is difficult to install and requires numerous studs which must be carefully positioned and themselves must be temperature resistant. Studs conduct heat to the cold face thereby decreasing the efficiency of the insulation. Studs are also expensive and subject to breakage from mechanical abuse and/or thermal shock.

It has also been practiced to utilize modules of ceramic fiber which are installed as units with the fibers of the modules arranged such that most of the fibers in the ceramic fiber mats lay in planes generally perpendicular to the wall. U.S. Pat. No. 3,819,468 to Sauder illustrates such a module system. U.S. Pat. No. 3,930,916 also illustrates such a system and refers to the fiber orientation as being "end-on" relative to the supporting layer of the module. These module systems may be installed by screwing, bolting or welding the modules to the furnace shell. These modules have enjoyed success because of the ease of installation, efficiency of heat insulation and ease of replacement of damaged modules. However, known edge grain module systems have suffered from the disadvantage that only one type of ceramic fiber may be utilized in a module. Therefore, expensive high temperature resistant ceramic fibers must be utilized to form the entire module even though the fibers near the cold face are exposed to temperatures much lower than their maximum use temperature.

There are also have been developed very high temperature ceramic fibers formed by solution gelling techniques which are commonly referred to as polycrystalline fibers. Such fibers are illustrated by U.S. Pat. No. 3,996,145 to Hepburn, 3,322,865 to Blaze, Jr., 4,277,269 to Sweeting and 4,159,205 to Miyahara. These polycrystalline fibers have a working temperature up to about 3000° F. However, these fibers are very expensive and expense has limited their use. It also has been a practice in the industry to blend the with lower temperature ceramic fibers to create a higher temperature resistant material with better strength properties and temperature resistance nearly equal to the polycrystalline fibers alone at reduced cost.

It has been proposed to utilize polycrystalline very high temperature resistant fibers in modules either singly or as a blend with lower temperature ceramic fibers. Such modules are ordinarily only about 3 inches in thickness and are cemented with refractory mortar over hard refractories or cemented to ceramic fiber modules. Such installation techniques are expensive in use of fiber and further are subject to failure as the cement bond between the hard refractory and the fibers or between the two types of fiber is subject to failure upon thermal cycling of the furnaces and further is very dependent upon high quality, careful installation.

Modules of composite construction which provide the entire insulation value of a furnace have been proposed. Such modules have a lower temperature fiber forming the interior of a cushion-like block, the outer covering of the cushion being a higher temperature ceramic fiber material. However, it is not believed that the polycrystalline ceramic fiber insulating materials have been successfully used in such constructions as mats of polycrystalline fibers have been too weak when used as a surface covering. They have lacked both strength and abrasion resistance to articles passing into and out of a furnace and even strong air currents in a furnace. Polycrystalline fiber structures of sufficient strength and abrasion resistance have been too rigid to be bent around the sides of the cushion and be compressed during installation. Modules formed of rigid board material are difficult to install without leaving gaps. Further, modules of a construction using several different types of fiber have been found to be expensive in labor costs for construction and in materials costs for fastening of the various elements of such modules together.

Therefore, there remains a need for a system of presenting the very high temperature resistant fibers to the hot face of a furnace wall preferably such that most of the fibers lie in planes generally perpendicular to the furnace wall, using only the minimum amount of these fibers at the hot face. Further, there remains a need for such a system that will allow utilization in module construction or in other constructions which place the edge grain of the module towards the hot face with the fibers of the mat laying in planes generally perpendicular to the wall or ceiling of the furnace. There is a further need for a commercially feasible system of providing insulation to furnaces operating with hot face temperatures of about 3000° F.

DISCLOSURE OF THE INVENTION

An object of this invention is to overcome disadvantages of prior systems of ceramic fiber insulation.

A further object of this invention is to provide lower cost high temperature insulation.

Another object of the invention is to provide an improved system of insulation of furnaces with ceramic fiber.

An additional object of this invention is to provide a very high temperature resistant insulation system exhibiting ease of installation.

Another object of this invention is to provide a system of high insulation value and low weight for high temperature furnaces.

Another object of this invention is to provide a system of insulation of furnaces having a fast thermal cycle time.

A further object of this invention is to provide furnace insulation equal in performance to polycrystalline fiber insulation but at fractional cost of polycrystalline fiber insulation in present use.

These and other objects of the invention are generally accomplished by providing a planar ceramic fiber felt or mat having a planar area or portion comprising a higher temperature resistant ceramic fiber and another planar portion of lower temperature resistant ceramic fiber. The two portions are joined seamlessly by an intermingling and intimate relationship of the two fiber types during the formation process. The invention further provides apparatus for formation of such ceramic fiber composites and further provides for forming such composite ceramic fiber members into modules.

In a particularly preferred system of the invention, a mat is formed with an outer edge portion of polycrstalline ceramic fiber blended with vitreous alumino-silicate ceramic fiber and this is intimately joined by an edge face to an edge face of a portion of only vitreous alumino-silicate ceramic fiber. These pieces are then aligned and joined into a module such that when installed in a furnace the edge faces or edge grain of the higher temperature resistant polycrystalline fiber containing portion will be exposed to the hot face of the furnace and the lower temperature resistant vitreous ceramic fiber portion will be exposed to the cold face of the furnace.

BRIEF DESCRIPTION OF THE DRAWINGS

FIG. 1 is a perspective view of a composite ceramic fiber mat in accordance with the invention.

FIG. 2 is a cross-sectional view of a ceramic fiber module composed of edge-grained pieces of the composite ceramic fiber product of the invention.

FIG. 3 is the cross-section of a folded module utilizing the composite insulating members of the invention.

FIG. 4 is a perspective view of apparatus for batch formation of ceramic fiber mat members in accordance with the invention.

FIG. 5 is a diagramatic sectional side elevation of continuous apparatus for production of ceramic fiber mat members in accordance with the invention.

FIG. 6 is an enlarged perspective view of the forming section of the continuous apparatus illustrated in FIG. 5.

FIG. 7 is a perspective view of alternate apparatus for continuous formation of fiber mat members in accordance with the inventive system.

BEST MODE FOR CARRYING OUT THE INVENTION

Figure 9:
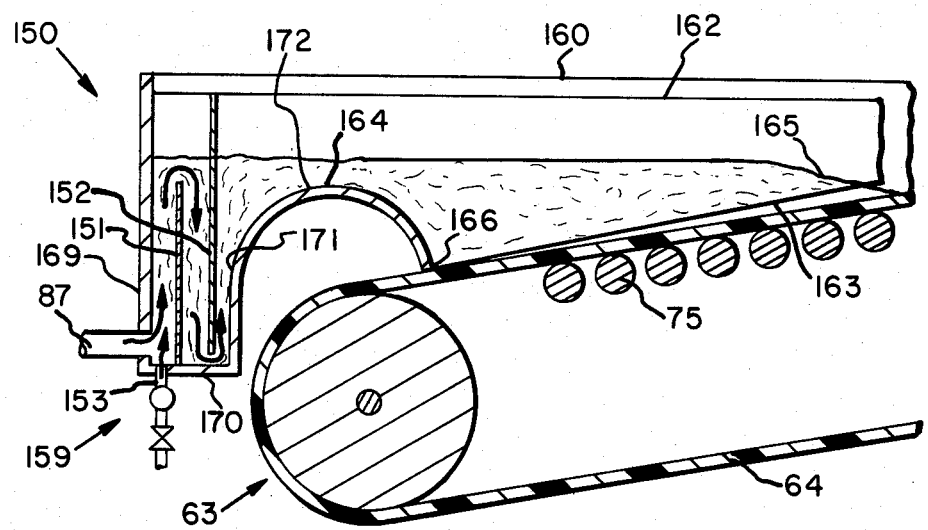
FIG. 9 is a sectional view taken along the plane indicated by line 9—9 of FIG. 8 and further includes indication of the liquid flow pattern established in use.

The system of the instant invention provides numerous advantages over prior ceramic insulation systems. The cost of polycrystalline fibers is about 16 times the cost of the conventional high temperature vitreous alumino-silicate ceramic fibers. The invention creates the possibility of taking advantage of the high temperature resistance of polycrystalline fibers at the very thin hot face where they are needed without the unnecessary use of these fibers at areas to be subjected to lesser temperature. By enabling the use of polycrystalline fibers in systems where edge graining is used, the heat transfer caused by stud insulation is eliminated. The elimination of studs at the hot face further has the advantage that the problem of thermal shock cracking and high temperature creep of the studs is eliminated. The difficulties of gluing and cementing thin layers of polycrystalline fibers which then may become detached under high temperature use is eliminated. Further, the system of the invention provides a low-cost forming method which does not require skilled labor for either formation of the ceramic fiber members, the modules or for installation. Another advantage is that the invention allows the variation of the amount of and composition of high temperature materials to meet the specific need of each user of ceramic fiber insulation. These and other numerous advantages of the instant system of ceramic fiber articles, formation methods and apparatus for formation of ceramic fiber members, will become apparent from the detailed description below.

FIG. 1 generally shows a composite ceramic fiber member or mat 3. Fiber member 3 is in the configuration of a rectangular body and as such has a pair of opposed planar faces 2 joined to four edge faces 4. Fiber member 3 is formed of two portions 5,7 of differing ceramic fiber composition. Portion 5 is of one composition while portion 7 is of another. Ordinarilly the smaller portion 7 would be of higher temperature resistant more expensive fiber. The area of joinder 9 is not a seam, but an area of intimate commingling and merging joinder of the two ceramic fiber compositions of area 7 and area 5. Portion 5 is itself in the shape of a rectangular body having a pair of planar faces 10 joined to edge faces 6. Portion 7 is itself in the shape of a rectangular body having a pair of planar faces 12 joined to edge faces 8.

FIG. 2 illustrates a module formed of a multiplicity of fiber members such as members 3 joined to backing plate 11. The generally planar members 3 extend perpendicularly to backing plate 11. Such backing plates ordinarily are expanded metal to which the fiber members 3 are cemented. The fibers of Module 13 extend in planes generally parallel to the planes of fiber members 3. Module 13 may be attached to the furnace by the conventional screwing or welding which is carried out by insertion of a screwing or welding device in the conventional manner between the fiber mats. When Module 13 is installed in a furnace the fibers of members 3 will be oriented generally end-on to the furnace wall. The edge faces 8 of adjacent members 3 will be presented to the hot face of the furnace (not shown).

FIG. 3 illustrates a folded module according to the invention. This folded module is generally indicated as numeral 23. Module 23 is composed of folded sheets of composite construction. Each sheet 20 prior to folding has a center portion 25 of high temperature resistant fiber and two edge portions 28 and 29 of lower temperature resistant fiber which after folding become the material to be presented to the cold face of a furnace while the folded center portion 25 will be presented to the hot face of a furnace.

In FIG. 4 is indicated a batch process device 31 for formation of the seamless comingled boundary composite fibrous materials of the invention. The device 31 comprises a generally rectangular member 40 having four joined vertical sides 33, 45, 47 and 49. The device further comprises a divider or weir member 35 which may be held in place at any desired position by wedges or clamps (not shown). Sides 45 and 47 have additional tracks 53, 54 and 51, 52 in which weir 35 may be placed for varying the structure of the sheet form. Further, it is possible that other weir members (not shown) could be placed in these pairs of tracks. In the bottom of the generally rectangular member formed by sides 45, 33, 47 and 49 is placed a foraminous member such as screen 37. Below the screen 37 is a generally funnel shaped means 43 through which water flowing from stock material (not illustrated) in the device is trapped and removed through pipe 39 and valve 41. The stock material is a liquid suspension or slurry of ceramic fiber, binder and additives such as fillers and colorants. Ordinarily suction or vacuum would be applied to pipe 39 so as to aid in drawing of water from stock material upon the screen 37. In use, high temperature resistant fiber in a liquid stock material is placed into the smaller compartment 57 formed between side 49, weir member 35 and portions of sides 45 and 47. A lower temperature resistant fiber in liquid suspension is placed into compartment 59 formed by weir member 35, side 33 and portions of sides 45 and 47. Vacuum is applied through pipe 39 after valve 41 is opened. The vacuum could be applied by means, not shown, such as a vacuum pump or a water column. Weir member 35 is raised to a predetermined level after addition of the stock material raising which gives the desired intermingling of fibers at the boundary or area of joinder to create a strong seamless construction. The predetermined level normally is arrived at by trial and error and is dependent on variables such as the viscosity of the stock systems, thickness of the piece being formed and suction applied to the system. Generally, it has been found that creating a two inch spacing between the bottom of the weir 35 and foraminous member 37 is satisfactory when a fiber member of about 1 inch thickness is formed. It is possible to vary the amount of high temperature resistant fiber portion of the finished article by placing the weir in grooves 53, 54 and 51, 52. Further, it is possible to make a composite structure of three parts, each joined without a seam by comingling of the fibers during formation by placing another weir, not shown, into grooves 51, 52 and placing a different stock material into the resultant cavity between the two weir members.

Composite members of three of more compositions or those having a center portion of different composition than that of the edge portions may be made by utilization of the system of the invention as above described. By this method, various different fibers or blends of different fibers may be arranged such that the most temperature resistant fibers will be presented to the hot face and the less temperature resistant fibers in the same structure will be presented to the cold face. The great savings is due to utilization of a minimum amount of the very high temperature resistant polycrystalline fibers which may sell for about $16.00 per pound in comparison with high temperature alumino-silicate ceramic fibers of vitreous glassy construction which sell for less that $1.00 per pound. The substitution of mineral wool fibers for vitreous ceramic fibers in the invention system results in a savings of about $.50 per pound, whereas the substitution of ceramic fibers for a unitary polycrystalline fiber article result in about a sixteen-fold savings. However, the invention contemplates any type of higher and lower temperature resistant fiber combination even though the savings may be les than when the high temperature resistance of polycrystalline fibers is to be obtained at minimum expense.

Another particular advantage of the instant invention is the modules may be designed to be suited for specific conditions of use at lowest cost. Knowing the hot face temperature to which the module will be subjected a particular thickness of module and thickness of polycrystalline or other high temperature material at the hot face may be designed. In one instance where the hot face would be exposed to about 2400° F. a module of eight inch total thickness has a three inch hot face thickness of a blend of 50 percent by weight polycrystalline alumina fibers having an alumina-to-silica ratio of greater than two (2) parts alumina to one (1) part silica and 50 percent by weight vitreous alumino-silicate conventional ceramic fibers having an alumina-to-silica ratio of about one seamlessly joined to a five inch cold face thickness of conventional vitreous high temperature alumino-silicate fibers. In the instance where the hot face would be exposed to temperatures of about 2900° F. a module could be designed with a four inch thickness hot face of 60 percent by weight polycrystalline alumina fibers blended with 40 percent by weight vitreous alumino-silicate vitreous fibers. The cold face of this latter 2900° F. module would then be between six and seven inches thickness of conventional high temperature vitreous alumino-silicate ceramic fibers. In each of the above modules the cold face temperature would be about 250° F. As can be seen, the ability to blend the minimum amount of expensive polycrystalline fiber necessary to impart the necessary temperature resistance to the hot face portion allows the formation of engineered modules which can most efficiently meet the temperature demands of a particular use.

FIG. 5 illustrates a continuous production process for the seamless, commingled joint composite members of the invention. In the continuous process, two different stock materials 62, 60 are supplied from supply means 66, 67 respectively to separate compartments 81, 83 respectively as shown in FIG. 6 of the stock head box 61 for feeding to the fourdrinier machine 63. The fourdrinier machine 63 comprises table rollers 75 where water may flow between the rollers 75 after the stock material is placed onto the foraminous belt member 64. Then the belt causes the stock material now at least partially solidfied into a fibrous mass to pass over suction boxes 77, 79 and 73. It is understood that that the particular construction of the fourdrinier machine may vary with more or less suction boxes, rollers and other changes known in the paper marking art for such machines. After leaving the fourdrinier machine 63, the wet fibrous mass 70 passes into a dryer 65 where a flow of heated air further dries the mass and cures the low temperature binder. After leaving the dryer 65, the material is cut into whatever size is desired, such as member 3 shown in FIG. 1, by cutting devices represented at 69 and then carried by conveyor such as 71 to packing or formation into desired products such as modules.

While the invention has been described utilizing a continuous former fourdrinier machine, it is also possible and within the scope of the invention to utilize other paper forming machines such as rotoformers, vertical formers and cylinders, none of which are illustrated herein. While illustrated with a fourdrinier machine, it is understood that the concept of the invention in which separate fibrous masses are brought together immediately prior to the dewatering section of a paper forming machine is applicable to any of the known paper making machines or other devices for formation of slabs, boards or sheets of fibrous material.

FIG. 6 is a detailed representation of a stock box 61 shown in FIG. 5 and the fourdrinier belt 64 wherein the seamless composites having an intermingled fiber joint are formed. The stock box 61 is generally divided lengthwise into two compartments 81 and 83 which are separated by weir member 85. The stock materials 62, 60 flow into the stock box 61 through pipes 87 and 89, respectively, from mixing means not shown, and storage means 66, 67, respectively, shown in FIG. 5. Ordinarily the material entering compartment 81 through piping 87 would be a higher temperature resistant fiber stock 62 which would be more expensive and therefore used in smaller proportions. A lower temperature resistant ceramic fiber stock 60 would enter compartment 83 through piping 89. The stocks 60, 62 after entering the box 61 pass under divider member 91 and rise up and over a threshhold 72 as shown in FIG. 5 and are delivered to a sloped apron or ramp 74 leading to the fourdrinier machine belt 64. It is to be noted that the two stock materials 62, 60 join after weir member 85 as indicated at point 93. The depth of the area 93 of commingling prior to going over the threshhold 72 and down the ramp 74 may be varied to achieve good strength of the joined area illustrated in FIG. 1 as numeral 9 with low wastage of the more expensive high temperature fibers.

FIG. 7 illustrates an alternative stock box construction generally indicated as 101. In this construction, a greater variance of construction of the finished member is enabled as the weir members are adjustable within a greater range. In the construction of stockbox 101, the box 101 may be divided into various configurations by the use of the three grooves 140, 141 and 142 and anywhere from one to three weir members. Shown are two weir members 105 and 107 in respective grooves 141 and 142 resting on divider member 108 which has three grooves 121, 123 and 125. Weir or separator members 105 and 107 are provided with adjustable devices to allow control of the blending of the stock materials at their point of joinder. These devices are insertable and removable blocks 109, 111, and 113 for separator 105 and 115, 117, 119 and 120 for separator 107. By removal and insertion of these devices the width of the area of commingled fibers may be regulated to provide good strength and minimum wastage of fibers at the joined area. Stock box 101 is provided with four inlets 127, 129, 131 and 135 for feeding stock materials into the entry area 102 behind divider 108. Side members 137 and 139 control the flow of the material down incline 141 after it passes over threshhold 143. The angle of incline 141 and the heigth of threshhold 143 may be formed to be adjustable as another way of controlling the area of blending and also the thickness of the stock material delivered to fourdrinier belt 64.

Figure 8:
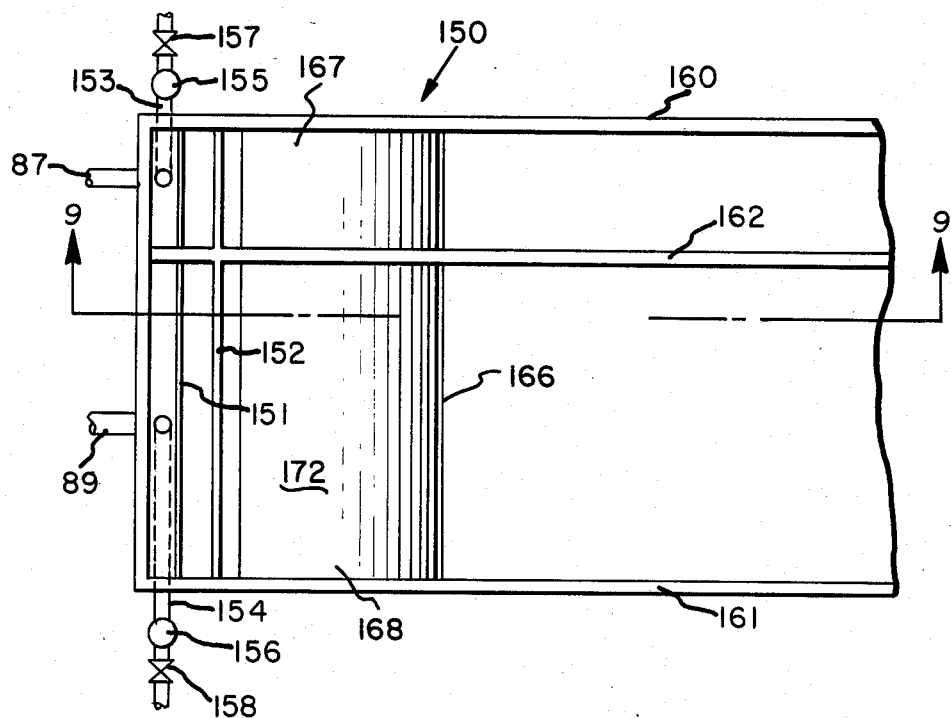
FIG. 8 is a fragmentary top view of continuous apparatus for production of ceramic fiber mat members in accordance with the invention.

Stock box 150, illustrated in FIGS. 8 and 9, is a preferred embodiment. Stock box 150 includes first and second baffles 151 and 152 respectively to provide even distribution of incoming stock across the width of the curved stock delivery means 164 and subsequently to the belt 64 of fourdrinier machine 63. Other means, not shown, such as rotating perforated rolls or tapered flow spreader nozzles may be substituted for or provided in addition to baffles to provide even distribution of the stocks to the curved delivery means. Stock box 150 is generally divided longitudinally, i.e., in the direction of flow of stock into two compartments 167 and 168, respectively, by separator member 162 and siderails 160 and 161. Separator member 162 is sealed against the back wall 169, the bottom wall 170, and curved stock delivery means 164 of stock box 150 to prevent premature mixing of stocks introduced through piping 87 and 89. Separator member 162 extends a considerable distance, for example three feet, in the direction of stock movement beyond that end 166 of the stock delivery means 164 that is proximate the fourdrinier belt 64. The bottom edge 163 of separator member 162 nearly contacts belt 64 adjacent the end 166 of stock delivery means 164 and from this point progressively extends a greater height above the belt 64 to its termination (not illustrated) distal the inlet piping 87, 89. The amount which the bottom edge 163 of the separator member 162 is positioned above the belt 64 influences the amount of commingling of the stocks introduced through piping 87, 89. Generally, increasing the distance between the bottom edge 163 of separator member 162 and belt 64 increases the amount of commingling; the converse is also true. The precise profile and spacing of the bottom edge 163 of separator member 162 from the fourdrinier belt 64 is determined empirically so that at any point in the machine direction, the spacing is slightly greater than the thickness of the mat being formed at that point. This spacing at any point is generally about $\frac{1}{8}$ to $\frac{1}{4}$ inch greater than the thickness of the mat at its corresponding point. Stock box 150 also includes means for introduction of additional liquid streams. These means include piping 153, 154, control valves 157, 158 and flow meters 155, 156 respectively.

The profile of curved stock delivery means 164 is determined empirically to reduce or prevent delivery of clumps of ceramic fiber shot to the fourdrinier belt 64. The profile, described beginning at the inlet end, as illustrated in FIG. 9, includes a vertical or near vertical segment 171 which is slightly convexly curved at its upper limit and joined without discontinuity to a more sharply convexly curved segment 172 that extends to the exit end of the stock box 150 and to the fourdrinier belt 64. The curved stock delivery means 164 is in the general configuration of a plane joined at one end to a portion of a cylinder. The profile just described causes the stock to accelerate as the stock rises after passing under baffle 152 with maximum velocity being exhibited at or near the highest elevation point of stock delivery means 164.

Stock box 150 also includes balance means 159 for introduction of additional liquid streams. Balance means 159 includes piping 153, 154, control valves 157, 158 and flow meters 155, 156, respectively. The higher temperature resistant stock 62 to be introduced through piping 87 will usually exhibit different formation characteristics than the lower temperature resistant stock 60 to be introduced through piping 89. Stocks 62 and 60 very often have different consistencies and drainage rates. A stock having a consistency of one percent contains one percent by weight of fiber in liquid. Additional water is provided through balance means 159 to further dilute the stocks 62 and 60 introduced through piping 87 and 89 respectively such that the area of joinder (indicated by numeral 9 in FIG. 1) remains in line with separator member 162 rather than being displaced toward siderail 160 or siderail 161. The required flow rates through piping 153 and 154 are established empirically. This is readily accomplished when a dye or pigment is added to at least one of the stocks that contrasts with the natural color of the others. For example, if the area of joinder is observed to extend into the space between stock box siderail 160 and separator member 162, control valve 157 could be opened or opened further to increase the amount of liquid delivered to compartment 167 or control valve 158, if open, could be throttled to reduce the amount of liquid delivered to compartment 168.

The vitreous ceramic fibers and polycrystalline ceramic fibers utilized in the instant process may be any fibers or combination of fibers which provide the desired temperature resistance. As used in the instant specification, temperature resistance is in reference to the use temperature at which fibers may be in continous service in a furnace. A greater temperature resistant fiber is more useful at a higher temperature than a lower temperature resistant fiber. As has been above stated, any combination of fibers giving the desired use temperature of the completed composite structure is suitable. Among fibers which typically may be utilized in the instant invention are the polycrystalline fibers which have use temperatures up to about 3000° F., mineral wool fibers which have use temperatures up to about 1500° F., basalt ceramic fibers which have use temperature up to about 2000° F., glass fibers which have use temperatures to about 1250° F. and high temperature polymer fibers such as polyimides. The polycrystalline ceramic fibers are generally formed by chemical ceramic techniques from sols and comprise very pure polycrystalline alumina, polycrystalline alumino-silicates; such as those of U.S. Pat. No. 4,277,269 to Sweeting and U.S. Pat. No. 4,159,205 to Miyahara or polycrystalline zirconia fibers. A preferred polycrystalline fiber comprises at least about 70 percent by weight alumina. Vitreous alumino-silicate ceramic fibers may be utilized at temperatures up to 2400° F. A preferred structure has a blend of high alumina polycrystalline fibers and vitreous alumino-silicate ceramic fibers at its hot face and 100 percent vitreous ceramic fiber of a chemical composition about a 50 percent alumina and 50 percent silica at its cold face. A preferred blend of polycrystalline ceramic fiber and vitreous ceramic fiber is about 50 percent by weight of the polycrystalline high alumina fiber with 50 percent by weight of the vitreous 50—50 alumina-silica fiber to give a very high use temperature up to about 2700° F. as well as good strength and abrasion resistance. This hot face material at about three inches depth in conjunction with a cold face material of about 100 percent vitreous alumino-silicate ceramic fibers at about seven inches depth has a hot face use temperature of about 2700° F. and when so exposed will exhibit a cold face temperature of below about 250° F.

Ceramic fiber articles generally are formed with binders for strength at least at low temperatures. Any binder which provides satisfactory strength for handling of the mat, for example, conversion into modules or direct installation into a furnace is suitable. Typical of such binders are thermosetting resins such as phenolics, melamines, ureas and refractory binders such as colloidal silica and alumina. A preferred binder is thermoplastic organic polymer latex as stock including this material is easy to form in the aqueous systems and imparts good strength to the wet fibrous mass prior to heating to dry the mass. It is generally preferred that the same binder system be utilized for both the hot face and cold face materials as this normally leads to a stronger joint. However, differing binders may be utilized if resulting strength is satisfactory.

The ratio of blends of the polycrystalline fiber with vitreous ceramic fibers may be any which gives the desired temperature resistant and abrasion resistant properties. A preferred range for the higher temperature resistant material is more than 40 percent polycrystalline fibers for low shrinkage, high temperature resistance and good strength. Increasing the polycrystalline fiber content will lower shrinkage and also raise the temperature resistance of the blend.

The thickness of the outer layer or hot face material of high temperature resistant fiber may be any thickness which provides enough insulation for the adjoining lower temperature resistant cold face material to stay at or below its safe maximum operating temperature. In the case of vitreous alumino-silicate ceramic fibers, this safe operating temperature generally is about 2200° F. The total insulation thickness provided to a given furnace will be determined by the economics of each situation. However, it is believed that a preferred module will be about a total of about 8 to 12 inches thick with a hot face blended to withstand about 2600° F. which would require a blended area of about three inches thickness of a 50—50 blend of polycrystalline ceramic fiber and conventional vitreous alumino-silicate fiber for the hot face material and one hundred percent conventional vitreous alumino-silicate ceramic fiber for the cold face material.

The insulation of the invention may be utilized in several different forms of high temperature insulation in which edge graining is practiced. As mentioned above, utilization in modules which are welded, screwed or glued to a backing material is one use. Futher, it is known to stack edge grain batts of ceramic fiber material which may be held in place by rods passing through them or they may be impaled on L-shaped spikes which are welded to the furnace wall. Any of these or other known mounting systems are suitable for practice with the composite insulating ceramic fiber structures of the invention.

The density of the fibrous structure at both the hot face and the cold face may be any density which provides sufficient strength, insulation and flexibility for the intended service conditions. It has been found that a satisfactory density for the hot face material is between 4 and 12 pounds per cubic foot. A preferred density for the hot face material is between 6 and about 8 pounds per cubic foot for high insulation value and the ability to be compressed upon installation. The cushiony or resilient property of the fiber is important as its compression during installation allows the material to expand during initial heat up and fill any gap caused during installation. End-on or edge grain orientation of the fibers in modules made from mat according to the invention results in most of the shrinkage occuring perpendicular to the furnace wall (in the direction of the thickness of the modules) rather than parallel to the furnace wall thereby reducing the possibility of gaps occuring between adjacent modules after exposure at their intended use temperature.

The interface between the hot face material and the cold face material or between different layers within the cold face material should be minimized to prevent waste but maintain physical integrity. Generally, a transition zone, such as that indicated by numeral 9 in FIG. 1, of intimate commingling of the fibers of between about ¼ inch and ½ inch is satisfactory for production of a structure wherein the seamless joint has about 80 percent strength at the joint as at the portions of a single fiber.

The area where the portions join has at least 50 percent of the strength of the weaker of the higher temperature resistant portion and the lower temperature resistant portion.

The thickness of the individual batts of the composite of the invention may be anything desired for the particular intended use. For ease of forming in wet systems, it is generally considered that a thickness of about 1 inch is preferred for ease of forming and also for traditional use of the resulting mat in the art. The overall length and depth or thickness of the cold and hot face portions may be anything suitable for the particular intended use.

The method of formation of the seamless composite fiber insulating material of the invention may be either batch or continuous as was set forth in the description of the drawings. Further, depending on the width of the fourdrinier machines, the material may be formed with one joint connecting two portions or several joints connecting more than two portions which are later cut to form separate pieces for formation into modules. For instance, the stock box illustrated in FIG. 7 could be utilized to form a hot face portion in the middle between weir members 105 and 107 with cold face material on either side. This structure could either be folded to form a module as in FIG. 3 or could be cut down the middle to form two separate batts for formation into a module as in FIG. 2.

It is also considered a novel feature of this invention that the two different fiber materials may be colored to produced different colors for indentification of their different temperature resistant properties. This is very important to assure and facilitate keeping the hot face portion of each fiber member aligned correctly when modules are formed. The fiber material as it goes through the various handling steps may become disoriented if not identified by color coding. Further, the labor involved in module formation is not highly skilled and color coding facilitates labor training and quality control for consistent results.

While it is preferred that the colorant material be incorporated into the fibrous mass such that the color coding is visible to an observer from any angle or when the material is cut or partially obscured it is also within the invention to color code in other manners, particularly in the continuous formation processes. It is within the invention to stripe the different composition materials while in the forming or drying stages to color code the materials immediately as they are formed when error should not take place. The striping could be done by spray painting or brushing the colorant onto the fiber as it passes through the dewatering and/or drying stages.

The following Examples illustrate the formation of a typical composite article in accordance with the invention. Parts are by weight unless otherwise indicated. Temperatures are in Fahrenheit unless otherwise indicated.

EXAMPLE 1

A hot face stock is formed by mixing equal amounts by weight of Saffil TM polycrystalline alumina fibers, available from Imperial Chemical Industries, with an equal amount by weight of vitreous ceramic aluminosilicate fiber of a 50 percent alumina - 50 percent silica composition. This is mixed in water to give about a 4 percent solids suspension of the fibers (4 percent consistency). A surfactant such as a sodium salt of alkyl napthalene sulfonic acid is utilized to aid in formation of the suspension. After the suspension is formed 5 percent by weight of dry fiber of thermoplastic latex emulsion of an acrlyonitrile-butadiene is mixed into the suspension. Then an amount of about 5 percent by weight of the dry fiber of colloidal silica is mixed into the suspension. Then alum is mixed into the suspension. Alum is a coagulant and is added in an amount sufficient to cause the pH to drop to between about $4\frac{1}{2}$ and 5. (Other coagulants that could be used include polyacrylamides, polyethyleneimides or ferric chloride.) The suspension is then diluted to about 0.25 to about 0.75 percent solids and is ready for pouring into the mat forming device of FIG. 4. The feed stock for the cold face portion contains the same ingredients except that vitreous alumino-silicate ceramic fiber is substituted for polycrystalline alumina fiber and that the colloidal silica is not utilized. Small additions of surfactants and/or viscosity modifiers can be added to make the drainage rates of the stocks about equal. These two stocks for the cold face and hot face are then poured into the appropriate sides of a molding or forming device such as that shown in FIG. 4 while a vacuum of about 1–2 psi is applied to the lower drain tube. The wet composite article is removed from the screen and contains about 50 percent solids. The wet composite article is then placed in a forced air dryer until dried. The drying includes heating to about 300° F. for between 1 and 5 minutes to polymerize the latex. (If a phenolic binder is used, heating would need to be to at least 375° F. to cure the phenolic resin. The dry material contains less than 5 percent water by weight. This Example was repeated enough times to create a series of 1 inch thick slabs of about 8 inches by 12 inches with the 8 inch measurement being taken parallel to the area of joinder between the two sections. Individual batts were found to have a strength at the seamless joint area of intermingled fibers of at least 80 percent of the strength within either of the other two sections.

EXAMPLE 2

Higher temperature resistant and lower temperature resistant stocks are prepared in a manner comparable to that described in Example 1. The higher temperature resistant (hot face stock) containing a coloring agent is diluted with water to a consistency of about 1.0 percent prior to introduction in to the smaller compartment 167 of an apparatus like that shown in FIGS. 8 and 9. The lower temperature resistant stock (cold face stock) is diluted to about 1.7 percent consistency prior to introduction to the larger compartment 168 of the apparatus. Additional water is added to the hot face stock via piping 153 to provide a consistency of about 0.6 percent in smaller compartment 167. Water is added to the cold face stock via piping 154 to provide a consistency of about 0.6 percent in large compartment 168. The diluted stocks rise over the apex of the stock delivery means 164 on opposite sides of longitudinally extending separator member 162 and pass from stock delivery means 164 to inclined fourdrinier belt 64. As the stocks are deposited on belt 64, the fibers assume an orientation generally parallel to the plane of the belt 64. The fibers are randomly oriented within planes parallel to that of the belt and exhibit very little orientation in the direction of the thickness of the mat being formed. As indicated in FIG. 9, the depth of the streams of stocks at the exit of delivery means 164 may be considerable. For example, in the manufacture of a one inch nominal thickness mat from the stocks described in this example, the depth of the stock at entry of the fourdrinier belt is about 4½ inches. If the area of joinder strays away from either side of separator member 162, the amount of dilution water added is adjusted to dynamically balance the system. These adjustments are made based on visual observations of the operating apparatus. Flow meters 155 and 156 permit empirically established operating conditions to be noted and used as a guide or base for subsequent runs. Balance means 159 enable the system to be acceptably mass balanced even when the hot face and cold face stocks exhibit different drainage rates.

The material at the exit of the fourdrinier belt 64 is treated as in Example 1.

Although, the foregoing describes presently preferred embodiments of the instant invention, it is understood that the invention may be practiced in still other forms within the scope of the following claims. For instance, combinations of vitreous alumino-silicate ceramic fiber for the hot face portion could be used with a cold face portion of mineral wool. Further, instead of hot air drying, dielectric or infrared drying could be utilized. Further, rather than the illustrated two-part modules those having sections of three or more different fibers could be utilized. A mat or module of three different compositions seamlessly joined would have a hot face portion, an intermediate portion and a cold face portion.

Further, the apparatus of the invention would find uses in other fibrous forming processes such as forming of wall board or paper. Such products also may have need of a unitary article which possesses different characteristics of strength, flame retardants or insulating properties. The apparatus herein disclosed would allow formation of such composite materials. Further, while particular head box designs are shown any head box design having its width divided into two or more sections and provided with inlets for at least two feed stocks could be utilized. Further, while the invention has been described as involving formation of the composite article of the invention by depositing from water it is also within the invention to use dry formation techniques to simultaneously deposit fibers from two or more air streams onto a foraminous member. Depositing from an air stream would not require water drainage. These and other variations would be within the instant invention as described in the claims attached hereto.

What is claimed is:

1. A method of forming a seamless composite ceramic fiber insulating mat which includes at least one portion comprising a sheet of lower temperature resistant insulating ceramic fibers and at least one portion comprising a sheet of higher temperature resistant insulating ceramic fibers wherein said at least one lower temperature resistant portion and said at least one higher temperature resistant portion are joined edge-to-edge by a transition zone of commingled fibers of said lower temperature resistant fibers and said higher temperature resistant fibers at the adjoining edges of the sheets, said method comprising providing a first liquid stream of ceramic fibrous material, providing at least one additional liquid stream of a different ceramic fibrous material having a different resistance to temperature, bringing the streams together in side-by-side relationship immediately prior to bringing said streams concurrently into contact with a foraminous member at different side-by-side portions thereof, removing liquid from the streams of fibrous material through said foraminous member and recovering a seamless composite mat.

2. The method of claim 1 wherein said first stream comprises a lower temperature resistant fibrous stock and said at least one additional stream comprises a higher temperature resistant fibrous stock.

3. The method of claim 2 wherein said higher temperature resistant fibrous stock comprises polycrystalline fibers.

4. The method of claim 3 wherein said lower temperature resistant stock comprises vitreous alumino-silicate fibers.

5. The method of claim 1 wherein said foraminous member is in motion.

6. The method of claim 1 wherein the fibers from each of said streams commingle at their side-by-side boundary areas with any adjacent streams contacted.

* * * * *